United States Patent
Seo et al.

(10) Patent No.: US 10,044,468 B2
(45) Date of Patent: Aug. 7, 2018

(54) OPTICAL TRANSCEIVER AND DATA MAPPING METHOD USING THEREOF

(71) Applicant: OE Solutions America, Inc., Englewood Cliffs, NJ (US)

(72) Inventors: Wanseok Seo, Irvine, CA (US); Jong Ho Kim, Irvine, CA (US); Moon Soo Park, Anyang-si (KR); Joon Sang Yu, Yongin-si (KR)

(73) Assignee: OE SOLUTIONS AMERICA, INC., Englewood Cliffs, NJ (US)

( * ) Notice: Subject to any disclaimer, the term of this patent is extended or adjusted under 35 U.S.C. 154(b) by 51 days.

(21) Appl. No.: 15/171,980

(22) Filed: Jun. 2, 2016

(65) Prior Publication Data

US 2016/0285590 A1   Sep. 29, 2016

Related U.S. Application Data

(63) Continuation of application No. PCT/US2014/068241, filed on Dec. 2, 2014.

(51) Int. Cl.
*H03M 13/00* (2006.01)
*H04L 1/00* (2006.01)
*H04B 10/40* (2013.01)

(52) U.S. Cl.
CPC ........... *H04L 1/0041* (2013.01); *H04B 10/40* (2013.01); *H04L 1/0045* (2013.01)

(58) Field of Classification Search
None
See application file for complete search history.

(56) References Cited

U.S. PATENT DOCUMENTS

| | | | |
|---|---|---|---|
| 5,940,018 A * | 8/1999 | Kim | H03M 5/08 341/94 |
| 7,127,653 B1 | 10/2006 | Gorshe | |
| 8,495,476 B2 * | 7/2013 | Abu-Surra | H03M 5/145 714/784 |
| 2001/0053225 A1 * | 12/2001 | Ohira | H04L 1/0083 380/239 |
| 2006/0212780 A1 | 9/2006 | Ohira et al. | |
| 2006/0256875 A1 | 11/2006 | McClellan | |
| 2009/0055871 A1 | 2/2009 | Song et al. | |
| 2011/0135312 A1 | 6/2011 | El-Ahmadi et al. | |
| 2011/0292932 A1 * | 12/2011 | Nichols | H04L 49/45 370/376 |

(Continued)

FOREIGN PATENT DOCUMENTS

WO   WO 2011/081930 A1   7/2011

OTHER PUBLICATIONS

European Search Report of International Patent Application No. 14867523.4, dated Jun. 26, 2017.

(Continued)

*Primary Examiner* — Daniel McMahon
(74) *Attorney, Agent, or Firm* — Arent Fox LLP

(57) ABSTRACT

Disclosed is an optical transceiver. The optical transceiver includes a decoder for decoding an 8B10B line-coded signal, a data mapper for separating the decoded signal into block units and securing extra memory capacity by mapping a data code and a block information code onto each of the separated blocks, and an FEC encoding unit for creating Forward Error Correction (FEC) data and mapping the FEC data onto the extra memory capacity.

18 Claims, 7 Drawing Sheets

(56) References Cited

U.S. PATENT DOCUMENTS

2011/0320905 A1\* 12/2011 Lin ...................... H04L 1/0067
714/752
2015/0110162 A1\* 4/2015 Van Den Bosch ...... H04B 1/38
375/219

OTHER PUBLICATIONS

Korean Office Action of related Korean Patent Application No. 10-2016-7017378 dated Aug. 20, 2017.
International Search Report and Written Opinion dated Mar. 6, 2015 for corresponding International Application No. PCT/US14/68241.

\* cited by examiner

OPTICAL TRANSCEIVER AND DATA MAPPING METHOD USING THEREOF

CROSS-REFERENCE TO RELATED APPLICATIONS

This present Application is a Continuation of International Application No. PCT/US2014/068241 filed Dec. 2, 2014, which claims priority to U.S. patent application Ser. No. 14/470,038, titled "Optical Transceiver and Data Mapping Method Using Thereof," filed Aug. 27, 2014, which claims priority to U.S. Provisional Application No. 61/910,546, titled "Optical Transceiver," filed Dec. 2, 2013, the disclosures of each of which are incorporated herein by reference in their entirety.

FIELD

The present disclosure relates to an optical transceiver and a data mapping method using thereof.

BACKGROUND

Ethernet is initially used as a method of connecting and communicating a plurality of computers with each other in an office or a small space, and such a communication network is frequently referred to as a Local Area Network (LAN).

Since the Ethernet generally performs data communications using a shared medium, a Media Access Control (MAC) protocol should be performed, and a CSMA/CD method defined in IEEE 802.3 is used in a wired Ethernet.

Although a 10 Mbps or 100 Mbps class Ethernet is the mainstream in the initial stage, transmission speed thereof has been increased at an incredibly rapid pace in the last several years, and standardization of a 1000 Ethernet beyond gigabit Ethernets has been completed and put into use currently.

In addition, the Ethernet is used even in a transmission area within some tens of kilometers out of an existing office area, and at this point, optical fiber cables are mainly used as a transmission medium. Particularly, the gigabit Ethernet is frequently used as an extremely effective data communication technique in a section which needs a small amount of transmission.

Since transmission through an optical fiber is not a transmission using a shared medium, a Media Access Control technique of a CSMA/CD method is not used. That is, in such a communication network, data are transmitted by only using a frame structure unique to the Ethernet and an Inter Packet gap (IGP).

A representative signal which uses an 8B1013 code is a gigabit Ethernet signal, in which MAC level transmission speed of the gigabit Ethernet is 1 Gbps, and 8B10B is used as a line code for transmission. An 8B10B signal is a signal having a DC-free feature, and it is used together with some control codes to distinguish boundaries of Ethernet MAC frames or as an IDLE pattern and the like. IEEE 802.3 defines twelve types of special codes.

Meanwhile, since a SONET/SDH system mainly for long haul transmission basically defines a digital hierarchy for the sake of voices, it is difficult to accept packet signals of the Ethernet or the like. However, ITU-T has standardized Generic Framing Procedure (GFP) around in the year 2000. A related recommendation is ITU-T G.7041. There are two types of GFPs, and one is GFP-F, which is a method of extracting only Ethernet packets from an Ethernet signal and transferring Ethernet packet information excluding preambles from the packets by mapping the Ethernet packet information to GFP packets as is.

The other one is a GFP-T method, in which an Ethernet signal is processed at the 8B10B code level without extracting the Ethernet packets.

Recently, even a Common Public Radio Interface (CPRI) signal or the like used between a base station and a remote station uses an 8B10B code. Most of Common Public Radio Interface signals are transmitted through an optical fiber cable, and transmission distance thereof is some tens of kilometers in average, and since a large number of optical connectors or the like are used by the nature of network configuration, loss of optical signals is increased, and thus probability of generating a transmission error is increased. Accordingly, in this case, it needs to improve transmission performance by applying a Forward Error Correction (FEC) technique or the like.

SUMMARY

Therefore, the present disclosure has been made in view of the above problems, and it is an object of the present disclosure to provide an optical transceiver for providing a frame structure capable of performing Forward Error Correction (FEC) without degrading transmission speed or changing bandwidth, and a data mapping method using thereof.

To accomplish the above object, according to one aspect of the present disclosure, there is provided an optical transceiver including: a decoder for decoding an 8B10B line-coded signal; a data mapper for separating the decoded signal into block units and securing extra memory capacity by mapping a data code and a block information code onto each of the separated blocks; and an FEC encoding unit for creating a Forward Error Correction (FEC) data and mapping the FEC data onto the extra memory capacity.

The number of bits of the extra memory capacity may be determined as a value calculated by subtracting the number of bits of the data code and the block information code from the total number of bits of each of the blocks before decoding.

The optical transceiver may further include a framer for forming a frame by mapping a plurality of blocks, onto which the Forward Error Correction data is mapped, to a GFP frame.

The framer may create an overhead signal and map the overhead signal onto the extra memory capacity.

The data mapper may separate the decoded signal into block units by combining eight 8-bit signals and secure the extra memory capacity by mapping sixty four bits of data code and one to fifteen bits of block information code onto each of the separated blocks.

The data mapper may separate the decoded signal into block units by combining eight 8-bit signals and secure fifteen bits of extra memory capacity by mapping sixty four bits of data code and one bit of block information code onto each of the separated blocks.

The data mapper may separate the decoded signal into block units by combining eight 8-bit signals and secure ten bits of extra memory capacity by mapping sixty four bits of data code and six bits of block information code onto each of the separated blocks.

The optical transceiver may further include a demultiplexer for splitting the 8B10B line-coded signal into a plurality of parallel signals and transferring the split signals to the decoder.

The optical transceiver may further include a multiplexer for multiplexing the frames into a serial signal.

According to another aspect of the present disclosure, there is provided a data mapping method including: a decoding step of decoding an 8B10B line-coded signal; a data mapping step of separating the decoded signal into block units and securing extra memory capacity by mapping a data code and a block information code onto each of the separated blocks; and an FEC encoding step of creating a Forward Error Correction (FEC) data and mapping the FEC data onto the extra memory capacity.

The number of bits of the extra memory capacity may be determined as a value calculated by subtracting the number of bits of the data code and the block information code from the total number of bits of each of the blocks before decoding.

The data mapping method may further include a framing step of forming a frame by mapping a plurality of blocks, onto which the Forward Error Correction data is mapped, to a GFP frame.

The framing step may include a step of creating an overhead signal and mapping the overhead signal onto the extra memory capacity.

The data mapping method may further include, before the decoding step, the step of splitting the 8B10B line-coded signal into a plurality of parallel signals.

The data mapping method may further include the step of multiplexing the frames into a serial signal.

The data mapping step may separate the decoded signal into block units by combining eight 8-bit signals and secure the extra memory capacity by mapping sixty four bits of data code and one to fifteen bits of block information code onto each of the separated blocks.

The data mapping step may separate the decoded signal into block units by combining eight 8-bit signals and secure fifteen bits of extra memory capacity by mapping sixty four bits of data code and one bit of block information code onto each of the separated blocks.

The data mapping step may separate the decoded signal into block units by combining eight 8-bit signals and secure ten bits of extra memory capacity by mapping sixty four bits of data code and six bits of block information code onto each of the separated blocks.

Figure 1:
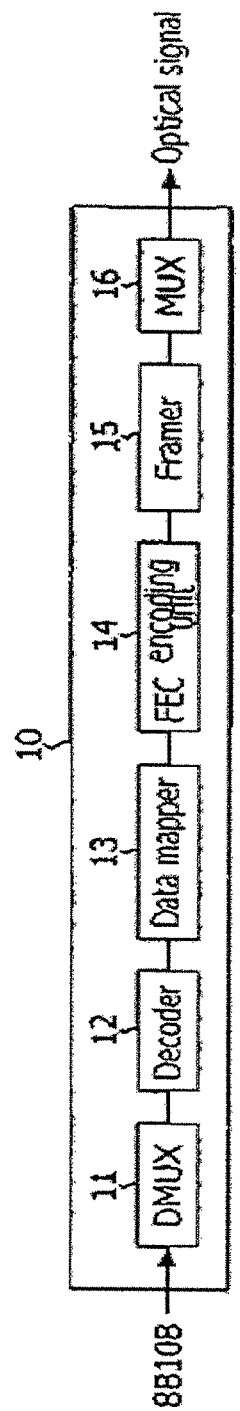
FIG. 1 is a block diagram conceptually illustrating a configuration of an example data mapping in an aspect of the present disclosure.

DESCRIPTION OF SYMBOLS 10, 20, 400: Optical transceiver
11, 21, 110, 210: Demultiplexer
12, 120: Decoder
13, 130: Data mapper
14, 23, 140: FCC encoding unit
15, 150: Framer
16, 26, 160, 260: Multiplexer
22, 220: Deframer
24, 240: Data demapper
25, 250: Encoder

DETAILED DESCRIPTION

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms including ordinal numbers such as first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when a constitutional component is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion.

The terms used herein is for the purpose of describing particular embodiments only and is not intended to be limiting of example embodiments. As used herein, the singular forms are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Hereafter, embodiments will be described in detail with reference to the accompanying drawings, and the same reference numerals are assigned to the same or corresponding constitutional components regardless of symbols of the drawings, and repeated descriptions thereof will be omitted.

FIG. 1 is a block diagram showing the configuration of an example mapping according to an embodiment of the present disclosure.

Referring to FIG. 1, an optical transceiver 10 according to an embodiment of the present disclosure may be configured to include a demultiplexer (DMUX) 11, a decoder 12, a data mapper 13, an FEC encoding unit 14, a framer 15 and a multiplexer (MUX) 16.

First, the demultiplexer 11 receives and splits an 8B10B line-coded signal into a plurality of parallel signals and transfers the split signals to the decoder 12.

The demultiplexer 11, for example, transfers a plurality of parallel signals created by separating an input client signal by the unit of ten bits to the decoder 12.

The decoder 12 decodes the plurality of 8810B line-coded parallel signals.

The decoder 12 decodes the 8B10B line-coded signals into 8-bit signals by removing line codes from the 8B10B line-coded signals and transfers the decoded signals to the data mapper 13.

The data mapper 13 separates the decoded signals into block units and secures extra memory capacity by mapping a data code and a block information code onto each of the separated blocks.

The data mapper 13, for example, separates the decoded signals into block units by combining eight 8-bit signals and secures extra memory capacity by mapping sixty four bits of data code and one to fifteen bits of block information code onto each of the separated blocks.

The number of bits of the extra memory capacity is determined as a value calculated by subtracting the number of bits of the data code and the block information code from the total number of bits of each of the blocks before decoding.

That is, when eight 8-bit signals are separated as a block unit, the number of bits of the extra memory capacity is determined as a value calculated by subtracting sixty four bits of the data code and x bits of the block information code from eighty bits of the total number of bits of each of the blocks before decoding.

The FEC encoding unit 14 creates a Forward Error Correction (FEC) data and maps the FEC data onto the extra memory capacity.

The FEC encoding unit 14 creates parity bytes by performing a Forward Error Correction encoding process on the input signal and maps the created parity bytes onto the extra memory capacity.

The FEC encoding unit 14, for example, may create the parity bytes, which are Forward Error Correction encoded data, by performing a Reed-Solomon encoding process on the input signal.

The framer 15 forms a frame by mapping a plurality of blocks, onto which the Forward Error Correction data are mapped, to a Generic Framing Procedure (GFP) frame.

The framer 15 forms a frame by periodically mapping a plurality of blocks, onto which the Forward Error Correction data are mapped, to a GFP frame in a method of processing an OE-converted signal itself at a Constant Bit Rate (CBR) and mapping the processed signal onto a GFP frame using a Generic Framing Procedure-Transparent (GFP-T) method.

The framer 15 forms an overhead signal and maps the overhead signal onto the extra memory capacity.

The framer 15 creates the overhead signal as much as required for signal processing and maps the created overhead signal to the extra memory capacity.

The multiplexer 16 multiplexes the frames into a serial signal and outputs the serial signal.

Figure 2:
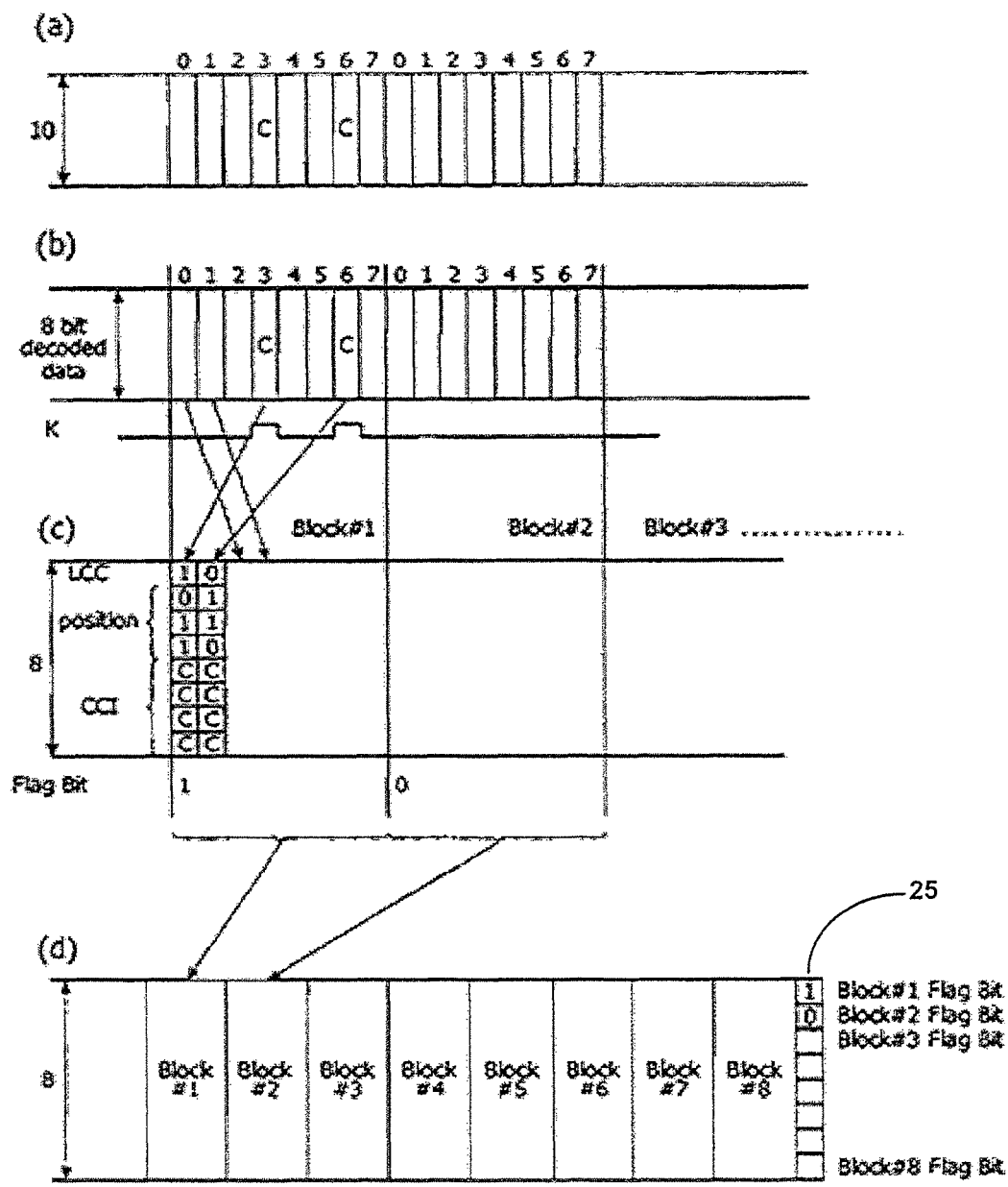
FIG. 2 is a view conceptually illustrating an example operation of GFP mapping.

FIG. 2 is a view illustrating the operation of GFP (or GFP-T) mapping procedures.

Referring to FIG. 2(a), first, the demultiplexer splits an input 8B10B signal into a plurality of parallel signals separated by the unit of ten bits.

Referring to FIG. 2(b), the decoder decodes a plurality of parallel signals into 8-bit signals by removing line codes from the parallel signals and transfers the decoded signals to the data mapper.

The decoder decodes an input signal into an original 8-bit value if the input signal is a code word and decodes the input signal into a 4-bit Control Code Indicator (CCI), 3-bit position information and an extra one bit if the input signal is a control word.

The extra bit of the control code is a Last Control Character (LCC) which includes information on whether or not a subsequent symbol is a control code.

That is, if the LCC is 1, it means that the next symbol is a control code, and if the LCC is 0, it means that the corresponding symbol is the last control code in the block.

The 3-bit position information indicates an original position of a control code within the sequence of eight symbols contained in the block.

At this point, since information on the control code is also removed from the input signal as the line code is removed, a control code is distinguished from a code word through the K signal.

Referring to FIG. 2(c), first, the data mapper separately specifies eight 8-bit signals as one block. The data mapper identifies control codes using K signal and sequentially maps the control codes from the starting point of a block.

The flag bit is a block information code expressing information on whether or not a corresponding block contains a control code, and if the flag bit is 1, it means that a control code exists in the corresponding block.

According to FIG. 2, the data mapper secures fifteen bits of extra memory capacity, which is a subtraction of sixty five bits from eighty bits of the input signal, by mapping sixty four bits of data code and one bit of block information code onto each of the blocks.

That is, 18.75% of the capacity of the input signal can be secured as extra memory capacity, and the FEC encoding unit may create a Forward Error Correction data and map the FEC data onto the secured extra memory capacity.

Referring to FIG. 2(d), eight blocks can be created and processed as a superblock for byte unit processing.

Figure 3:
FIG. 3 is a view conceptually illustrating an example structure of a frame formed in accordance with an aspect of the present disclosure.
Figure 4:
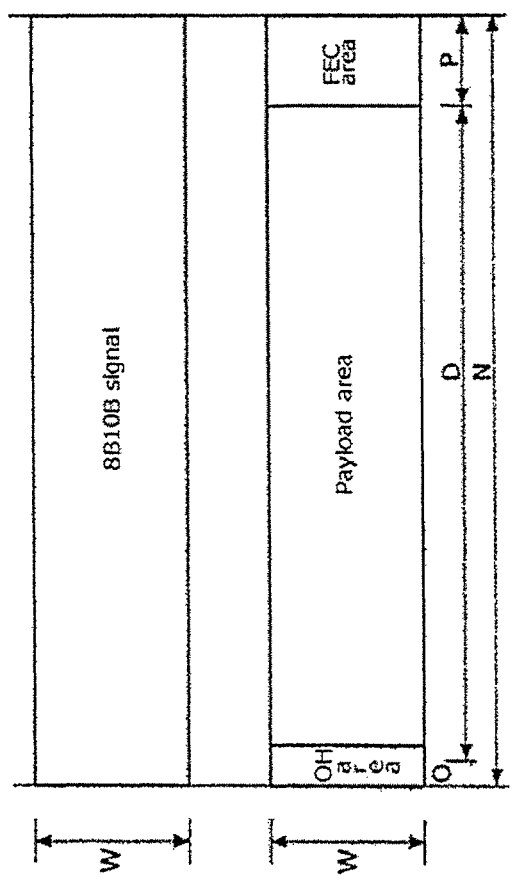
FIG. 4 is a view conceptually illustrating comparison of a frame formed in accordance with an aspect of the present disclosure with an input signal.

FIG. 3 is a view showing the structure of a frame formed according to an embodiment of the present disclosure, and FIG. 4 is a view comparing a frame formed according to an embodiment of the present disclosure with an input signal.

Referring to FIG. 3, the framer forms a frame by mapping a plurality of blocks to a GFP frame, and the OH area means an overhead signal mapped to the extra memory capacity, the payload area means a data code and a block information code, and the FEC area means a Forward Error Correction data mapped to the extra memory capacity.

Referring to FIG. 4, it can be continued that the number of bits of an 8B10B signal, which is an input signal, is the same as the total number N of bits of a frame formed according to an embodiment of the present disclosure.

The frame formed according to an embodiment of the present disclosure secures extra memory capacity as much as 0+P bits by reconfiguring the 81310B input signal, and the overhead signal and the Forward Error Correction data can be loaded and transmitted together while maintaining the transmission speed and the bandwidth.

Figure 5:
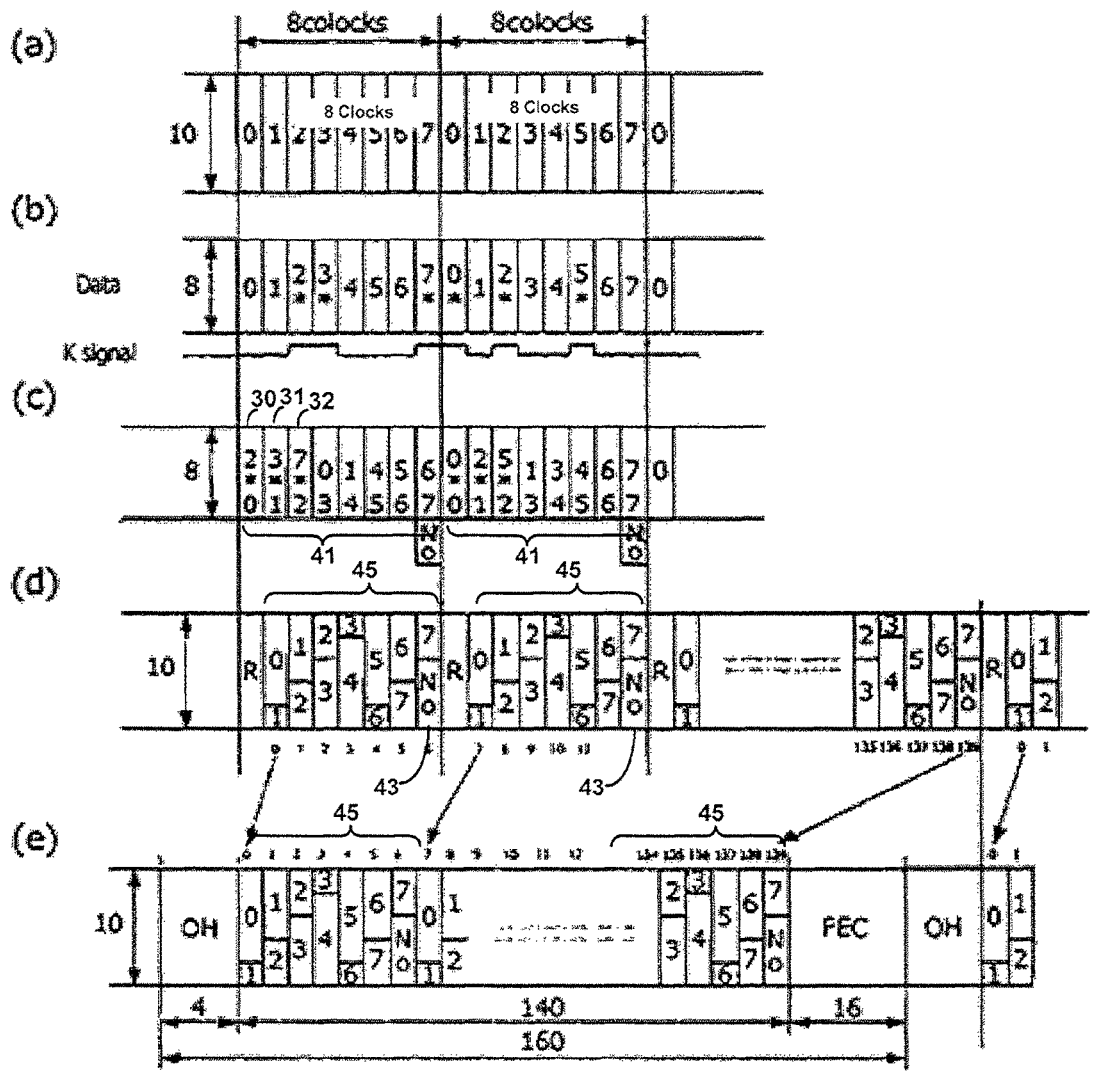
FIG. 5 is a view conceptually illustrating an example data mapping in accordance with an aspect of the present disclosure.

FIG. 5 is a view conceptually illustrating an example data mapping and/or framing procedure in accordance with an aspect of the present disclosure.

Referring to FIG. 5(a), the decoder 120 decodes a plurality of parallel signals (e.g., signal 0, signal 1, . . . , signal 7 each signal comprising 10 bits) into 8-bit signals by removing line codes from the parallel signals and transfers the decoded signals to the mapping unit 130.

Referring to FIG. 5(b), the decoder 120 decodes an input signal into an original 8-bit value if the input signal is a code word, and decodes the input signal into a 4-bit Control Code Indicator (CCI), 3-bit position information and an extra one bit if the input signal is a control word.

At this point, since information on the control code is also removed from the input signal as the line code is removed, a control code is distinguished from a code word through the K signal. As shown in FIG. 5(b) each signal including a control code is designated by "*" in the drawing. As such, by means of the K signal the control codes are identified in a plurality of 8-bit signals.

Referring to FIG. 5(c), first, the data mapper 120 separately specifies eight 8-bit signals as one block. The data mapper 120 identifies control codes (designated by "*") using the K signal and sequentially maps the control codes 30, 31, 32 from a starting point of a block 41.

The data mapper 120 also maps information on the number of control codes contained in the corresponding block 41 (e.g., the number of "*" designated 8-bit signals) to a 6-bit block information code such as NO, as shown in FIG. 5(c).

In another aspect of the present disclosure, the LCC and flag bit may not be used, and the number of codes contained in a corresponding block may be expressed as a 6-bit binary code.

Referring to FIG. 5(d), the data mapper 130 reconfigures each 64-bits block to be 80-bits unit block have sixty four (64) bits of data code and six (6) bits of block information code (NO) in each block 41 by encoding a mapped block by the unit of ten (10) bits. That is, it can be seen that the 8-bits blocks from FIG. 5(c) are reconfigured in 10-bits blocks conceptually stacked at the end of each 10-bits block from left to right and end with the block information code NO, which comprises 6 bits. As can be seen in FIG. 5(d), the information code NO is positioned at the end of the $7^{th}$ sub-block 43 of each 80-bits unit block 45. In a similar manner, in each 8-bits unit block 45, the information code NO is placed at the end of the $7^{th}$ sub-block 43 of the 80-bits unit block 45.

Now referring to FIG. 5(e), the data mapper 130 secures ten (10) bits of extra memory capacity, which can be obtained by subtracting seventy (70) bits from eighty (80) bits of the input signal, by mapping sixty four (64) bits of data code and six (6) bits of block information code (NO) onto each of the blocks.

That is, 12.75% of the capacity of the input signal can be secured as extra memory capacity for other purposes. So, the secured extra memory capacity can be used to improve efficiency and performance of a communication link such as an optical link. After the data mapping by the data mapper 130, the FEC encoding unit 140 may create a Forward Error Correction (FEC) data and map the FEC data onto the secured extra memory capacity.

In another aspect of the present disclosure, while the GFP frame as shown in FIG. 2(d) illustrates use of a superblock 25 (at the end of all of the data blocks), such as an 8-bits stacked flag bits for byte unit processing, the present technology does not such a superblock. In contrast, the block information code (NO) is used or inserted in each 80-bits unit block 45. As a result, signal processing can be done much efficiently and can reduce any time delay often occurring in byte processing of GFP frames at a receiving end of an optical communication. FIG. 5(e) shows an example frame structure in accordance with aspects of the present disclosure.

As shown in FIG. 5(d) or 5(e), since the block information code (NO) is not in a form of a superblock as in a general GFP frame structure, each block (e.g., 80-bits block) can be processed one at a time, thereby improving processing efficiency, whereas ITU-T standards/recommendations require use of collected flags at the end of 8 blocks of data. As a result, at the receiving end of an optical communication network, the size of a receive buffer can be reduced, for example, by a block, and processing latency can be reduced by a factor of ⅛. Further, in an aspect of the present disclosure, since an input bit rate is the same as an output bit rate, a receiving clock circuitry can be further simplified.

Further, it is noted that during the data mapping processing, unlike processing of flag bits at one time at the end of block data processing as in GFP, for each block, certain information on a flag bit or the number of control bytes or data bytes can be inserted in the block for subsequent processing. It is also noted that the above mapping processing in combination of FEC processing may provide improved efficiency and latency in an optical communication system embodying the present technology described herein.

Figure 6:
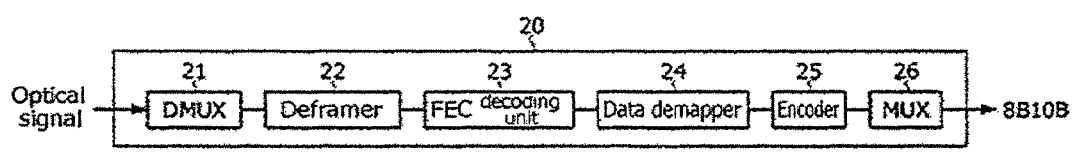
FIG. 6 is a block diagram conceptually illustrating an example data demapping at a receiver side in accordance with an aspect of the present disclosure.

FIG. 6 is a block diagram showing an example data demapping in accordance with an aspect of the present disclosure.

Referring to FIG. 6, a demapper 20 according to an aspect of the present disclosure may be configured to include a demultiplexer (DMUX) 21, a deframer 22, an FEC decoding unit 23, a data demapper 24, an encoder 25 and a multiplexer (MUX) 26.

First, the demultiplexer 21 receives and splits an optical signal into a plurality of parallel signals and transfers the split signals to the deframer 22.

The deframer 22 analyzes a GFP frame, extracts an overhead signal, and performs signal processing.

The FEC decoding unit 23 decodes FEC data and performs an error correction function on the data.

The signals contained in the payload area are recovered and demapped by the data demapper 24, and they are line-coded and output as an 8B10B signal by way of the encoder 25 and the multiplexer 26.

FIG. 6 shows the operation of an optical transceiver described through FIGS. 1 to 5, from a viewpoint of a receiving end, assuming that the optical transceiver may perform both an optical transmitter function and an optical receiver function.

Figure 7:
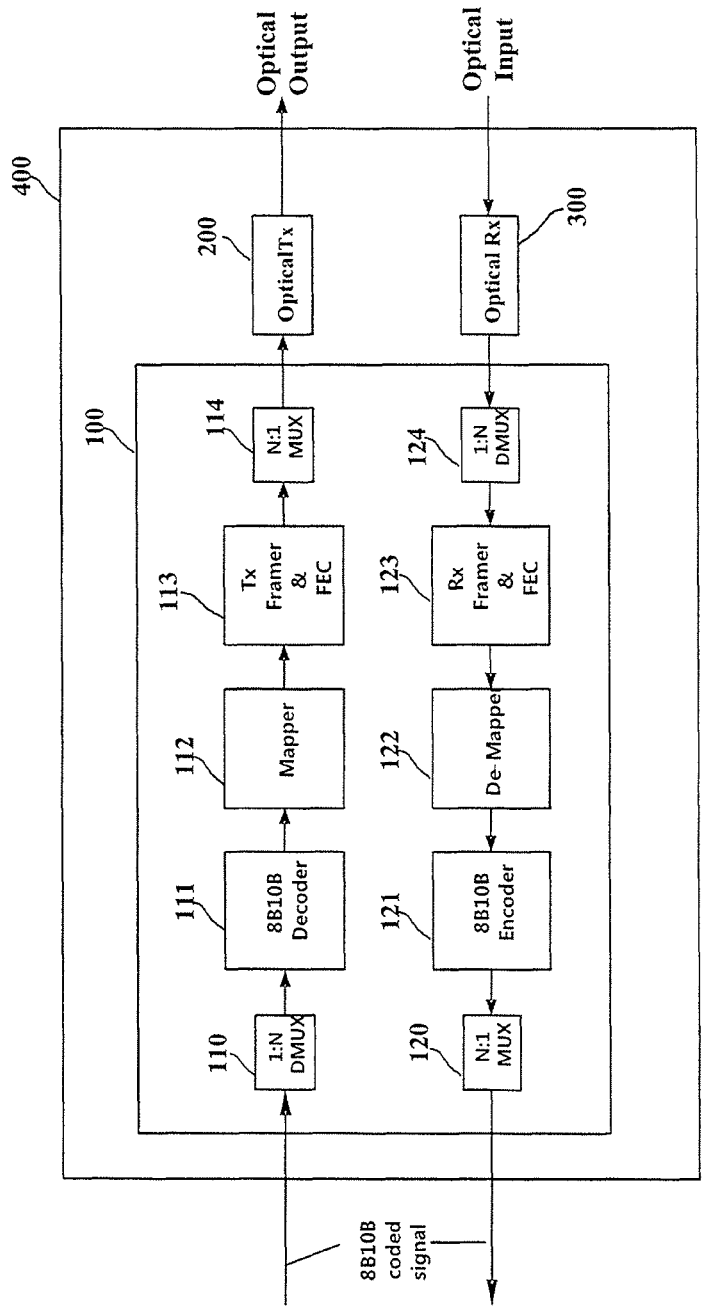
FIG. 7 is a block diagram conceptually illustrating an example configuration of an optical transceiver in accordance with an aspect of the present disclosure.

FIG. 7 is a block diagram conceptually illustrating an optical transceiver according to an aspect of the present disclosure.

Referring to FIG. 7, an optical transceiver 1000 according to another embodiment of the present disclosure may be configured to include demultiplexers (DMUX) 110 and 210, a decoder 120, a data mapper 130, an FEC encoding unit 140, a framer 150, a deframer 220, an FEC decoding unit 230, a data demapper 240, an encoder 250 and multiplexers 160 and 260, and optical transmitter 170 and an optical receiver 200.

FIG. 7 illustrates an operation of an optical transceiver described through FIGS. 1 to 6, from a viewpoint of a transmitting end and a receiving end, assuming the optical transceiver may perform both an optical transmitter function and an optical receiver function.

A term referred to as 'unit' used in the embodiment means software or a hardware constitutional component such as a Field Programmable Gate Array (FPGA) or an ASIC, and the 'unit' performs a certain function. However, the 'unit' is a not a meaning limited only to software or hardware. The 'unit' may be configured to be stored in an addressable storage medium or may be configured to reproduce one or more processors. Accordingly, for example, the 'unit' includes constitutional components such as software constitutional components, object-oriented software constitutional components, class constitutional components and task constitutional components, processors, functions, attributes, procedures, sub-routines, segments of a program code, drivers, drivers, firmware, micro-codes, circuits, data, databases, data structures, tables, arrays and variables. The functions provided in the constitutional components or the 'units' may be combined as a smaller number of constitutional components or 'units' or may be further separated into additional constitutional components or 'units'. Furthermore, the constitutional components or 'units' may be implemented to reproduce one or more CPUs within a device or a security multimedia card.

An optical transceiver and a data mapping method using thereof may perform Forward Error Correction (EEC) without degrading transmission speed or changing bandwidth.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

What is claimed is:

1. An optical transceiver comprising:
    a decoder configured to decode an 8B10B line-coded signal;
    a data mapper configured to divide a decoded signal from the decoder into block units by combining eight 8-bit signals and securing fifteen bits of extra memory capacity as a result of mapping sixty four bits of data code and one bit of block information code into each of the divided block units; and
    a Forward Error Correction (FEC) encoding unit for creating an FEC data and mapping the FEC data into the extra memory capacity,
    wherein the decoder is further configured to decode the 8B10B line-coded signal based on a determination as to whether an input signal is a code word or a control word.

2. The optical transceiver according to claim 1, wherein a number of bits of the extra memory capacity is determined as a value calculated by subtracting a number of bits of the data code and the block information code from a total number of bits of the 8B10B line-coded signal before decoding.

3. The optical transceiver according to claim 1, further comprising a framer for forming a frame by mapping a plurality of blocks, into which the FEC data is mapped, to a Generic Framing Protocol (GFP) frame.

4. The optical transceiver according to claim 2, wherein the framer creates an overhead signal and maps the overhead signal into the extra memory capacity.

5. The optical transceiver according to claim 1, wherein the data mapper is configured to divide the decoded signal into block units by combining eight 8-bit signals and secures ten bits of extra memory capacity by mapping sixty four bits of data code and six bits of block information code into each of the separated blocks.

6. The optical transceiver according to claim 1, further comprising a demultiplexer for splitting the 8B10B line-coded signal into a plurality of parallel signals and transferring the split signals to the decoder.

7. The optical transceiver according to claim 3, further comprising a multiplexer for multiplexing the frames into a serial signal.

8. A data mapping method in an optical communication system, the method comprising:
    a decoding step of decoding an 8B10B line-coded signal;
    a data mapping step of dividing the decoded signal from the decoder into block units by combining eight 8-bit signals and securing fifteen bits of extra memory capacity as a result of mapping sixty four bits of data code and one bit of block information code into each of the divided block units; and
    a Forward Error Correction (FEC) encoding step of creating an FEC data and mapping the FEC data into the extra memory capacity, wherein the decoder is further configured to decode the 8B10B line-coded signal based on a determination as to whether an input signal is a code word or a control word.

9. The data mapping method according to claim 7, wherein a number of bits of the extra memory capacity is determined as a value calculated by subtracting a number of bits of the data code and the block information code from a total number of bits of the 8B10B line-coded signal before decoding.

10. The data mapping method according to claim 8, further comprising a framing step of forming a frame by mapping a plurality of blocks, onto which the FEC data is mapped, to a Generic Framing Procedure (GFP) frame.

11. The data mapping method according to claim 9, wherein the framing step includes a step of creating an overhead signal and mapping the overhead signal into the extra memory capacity.

12. The data mapping method according to claim 8, further comprising, before the decoding step, the step of splitting the 8B10B line-coded signal into a plurality of parallel signals.

13. The data mapping method according to claim 10, further comprising the step of multiplexing the frames into a serial signal.

14. The data mapping method according to claim 8, wherein the data mapping step further comprises dividing the decoded signal into block units by combining eight 8-bit signals and secures ten bits of extra memory capacity by mapping sixty four bits of data code and six bits of block information code onto each of the separated blocks.

15. The data mapping method according to claim 8, wherein the data mapping step further comprises inserting a block information code in each block unit, the block information code comprising information on at least one of: a number of data bytes or control bytes.

16. The optical transceiver of claim 1, wherein the data mapper is further configured to insert a block information code in each block unit, the block information code comprising information on at least one of: a number of data bytes or control bytes.

17. The optical transceiver of claim 1, wherein the data mapper is further configured to decode the 8B10B line-coded signal into an original 8-bit value when the input signal is determined to be a code word.

18. The optical transceiver of claim 1, wherein the data mapper is further configured to decode the 8B10B line-coded signal into a plurality of bits comprising a 4-bit Control Code Indicator (CCI), 3-bit position information and an extra one bit when the input signal is determined to be a control word; and
　　wherein the extra one bit indicates whether a subsequent symbol is a control code, the 3-bit position information indicates an original position of the conde code among a sequence of eight symbols contained in the block.

* * * * *